US012638017B2

(12) United States Patent (10) Patent No.: US 12,638,017 B2
Liu et al. (45) Date of Patent: May 26, 2026

(54) WATER PUMPS FOR LANDSCAPE WATER

(71) Applicant: SUZHOU UNIVERSITY OF SCIENCE AND TECHNOLOGY, Suzhou (CN)

(72) Inventors: Rundong Liu, Suzhou (CN); Dapeng Li, Suzhou (CN); Feiyue Qian, Suzhou (CN)

(73) Assignee: SUZHOU UNIVERSITY OF SCIENCE AND TECHNOLOGY, Suzhou. (CN)

( * ) Notice: Subject to any disclaimer, the term of this patent is extended or adjusted under 35 U.S.C. 154(b) by 0 days.

(21) Appl. No.: 19/060,776

(22) Filed: Feb. 23, 2025

(65) Prior Publication Data

US 2025/0188939 A1 Jun. 12, 2025

Related U.S. Application Data

(63) Continuation of application No. 18/181,533, filed on Mar. 9, 2023, now Pat. No. 12,258,969.

(30) Foreign Application Priority Data

Nov. 30, 2022 (CN) ......................... 202223183295.X

(51) Int. Cl.
F04D 13/08 (2006.01)
B01D 29/58 (2006.01)
B01D 29/60 (2006.01)
B01D 35/02 (2006.01)
F04D 15/00 (2006.01)
(Continued)

(52) U.S. Cl.
CPC ........... *F04D 13/086* (2013.01); *B01D 29/58* (2013.01); *B01D 29/60* (2013.01); *B01D 35/02* (2013.01); *F04D 15/0088* (2013.01); *F04D 29/406* (2013.01); *F04D 29/708* (2013.01); *B01D 2201/282* (2013.01); *F04D 13/06* (2013.01)

(58) Field of Classification Search
CPC .... F04D 13/086; F04D 13/06; F04D 15/0088; F04D 29/406; F04D 29/708; B01D 29/58; B01D 29/60; B01D 35/02; B01D 2201/282
See application file for complete search history.

(56) References Cited

U.S. PATENT DOCUMENTS 4,013,383 A 3/1977 Rule
4,631,006 A 12/1986 Murray
(Continued)

FOREIGN PATENT DOCUMENTS

CN 203756452 U 8/2014

*Primary Examiner* — Charles G Freay
(74) *Attorney, Agent, or Firm* — METIS IP LLC

(57) ABSTRACT

Water pumps for an urban water landscape, including a water pump main body, a water pump base, a grille net cover, and a filter component. The water pump main body includes a water pump shell. A water outlet interface is disposed on a top of the water pump shell. The grille net cover is located on a front side of the water pump shell. The grille net cover is fixedly connected to the water pump shell through a filter component pallet on a bottom of the grille net cover and filter component cross bars on two sides of the grille net cover. Two filter assemblies are inserted in series in the filter component slot. The water pump main body is detachably disposed on the water pump base.

7 Claims, 9 Drawing Sheets

(51) Int. Cl.
    *F04D 29/40*         (2006.01)
    *F04D 29/70*         (2006.01)
    *F04D 13/06*         (2006.01)

(56)             References Cited

U.S. PATENT DOCUMENTS

| | | | |
|---|---|---|---|
| 5,184,946 A | 2/1993 | Sato | |
| 12,258,969 B2 * | 3/2025 | Liu | F04D 13/086 |
| 2006/0257269 A1 | 11/2006 | Lee et al. | |
| 2020/0164293 A1 * | 5/2020 | Wong | B01D 21/0012 |
| 2020/0236902 A1 | 7/2020 | Grieger | |
| 2021/0095685 A1 | 4/2021 | Justl et al. | |
| 2022/0018350 A1 | 1/2022 | Lin | |
| 2022/0299043 A1 * | 9/2022 | Wang | F04D 15/0218 |
| 2023/0070541 A1 * | 3/2023 | Avila | F04D 15/0218 |

* cited by examiner

309

308

310

311

WATER PUMPS FOR LANDSCAPE WATER

CROSS-REFERENCE TO RELATED APPLICATION

This application is a continuation of U.S. patent application Ser. No. 18/181,533, filed on Mar. 9, 2023, which claims priority of Chinese Patent Application No. 202223183295. X, filled on Nov. 30, 2022, the contents of which are entirely incorporated herein by reference.

TECHNICAL FIELD

The present disclosure relates to a technical field of a water landscape device, and in particular, to water pumps for an urban water landscape.

BACKGROUND

A water pump is a mechanical device that pressurizes water or other liquids and transports the water or other liquids to a high place. Most of the current water pumps lack an anti-fouling device, so in the application of a water landscape such as a private garden or an urban park, sticky substances such as fish feces or algae are very likely to exist on the blades of the water pump, thereby affecting the working efficiency of the water pump, even causing damage to the water pump, and reducing the service life of the water pump. In addition, as the water pump is usually installed somewhere at the bottom of the water landscape, it is inconvenient to disassemble components of the water pump and an operation such as replacement, cleaning, etc. is cumbersome and time-consuming.

Therefore, it is desirable to provide water pumps for a urban water landscape.

SUMMARY

One of the embodiments of the present disclosure provides a water pump for an urban water landscape. The water pump for an urban water landscape may include a water pump main body, a water pump base, a grille net cover, and a filter component. The water pump main body may include a water pump shell. A water outlet interface may be disposed on a top of the water pump shell. A water inlet hole may be disposed on a front end face of the water pump shell. A water channel with two ends respectively connected to the water inlet hole and the water outlet interface may be disposed inside the water pump shell. A motor chamber independent from the water channel may be disposed inside the water pump shell. A motor may be disposed in the motor chamber. An impeller may be disposed in the water channel. An output shaft of the motor may penetrate into the water channel from the motor chamber and may be connected to the impeller. A power cord of the motor may be drawn out from a back side of the water pump shell and connected to a power interface. The grille net cover may be located on a front side of the water pump shell. The grille net cover may be fixedly connected to the water pump shell through a filter component pallet on a bottom of the grille net cover and filter component cross bars on two sides of the grille net cover. A space between the grille net cover and the water pump shell may constitute a filter component slot through the filter component pallet and the filter component cross bars. Two filter components may be inserted in series in the filter component slot. The water pump main body may be detachably disposed on the water pump base. Four top corners of the water pump base may be respectively provided with screw holes for being fixedly connected to a bottom of a water landscape pool.

In some embodiments, the filter component may consist of a filter component annular frame, a filter hole plate, a filter medium, a sealing ring, and a filter component handle. The two filter hole plates may be detachably covered on front and back openings of the filter component annular frame, respectively. Outer edges of the two filter hole plates may be provided with the sealing rings. The filter hole plates may be sealed with the front and back openings of the filter component annular frame through the corresponding sealing rings. The filter medium may be freely filled in a space formed by the filter component annular frame and the two filter hole plates. The filter component handle may be detachably disposed on a top of the filter component annular frame.

In some embodiments, the filter medium may be a filter cotton, a volcanic stone, a medical stone, or a breathing ring.

In some embodiments, the filter component handle may be connected to the filter component annular frame through a corresponding buckle.

In some embodiments, two filter component blocks may be respectively disposed on outer walls on the left and right sides of the filter component annular frame. Inner walls of the two filter component cross bars on the left and right may be respectively provided with filter component block slots that match the filter component blocks. The filter component may be stable and orderly in the filter component slot through clamping and fitting between the left and right filter component blocks and the left and right filter component block slots.

In some embodiments, an inner side edge of the filter hole plate may be provided with a plurality of filter hole plate blocks. Front and back edges of the filter component annular frame may be provided with filter hole plate block slots matching the filter hole plate blocks. The filter hole plate may be fixedly connected to the filter component annular frame through clamping and fitting between the filter hole plate blocks and the filter hole plate block slots.

In some embodiments, an upper surface of the water pump base may be provided with a plurality of parallel water pump installation chutes. A bottom of the water pump shell may be provided with a plurality of water pump installation ridges matching the water pump installation chutes. The water pump main body may be detachably installed on the water pump base through plug-in and fitting between the water pump installation ridges and the water pump installation chutes.

In some embodiments, a water pump handle may be disposed on a top of the water pump shell.

In some embodiments, a flow control valve may be disposed on the water outlet interface.

In some embodiments, the motor may be a direct-current (DC) motor supporting pulse width modulation (PWM) speed regulation.

In some embodiments, the water pump for an urban water landscape may further include a pressure sensor, a cable, a telescopic rod, a magnet, and a water quality detection sensor. The pressure sensor may be disposed on the filter component. The cable may be wound around the filter component handle. A color-labeled suspension ball may be provided at an outlet of the cable. The suspension ball may be used for periodical release and retraction. The cable may be used for communication between the pressure sensor and a computing platform. A reel of the cable may be disconnectably connected to the motor through a transmission mechanism. A controller may control disconnection and connection between the reel of the cable and the motor to realize the periodical release and retraction of the suspension ball. The suspension ball may surface after release and communicate with the computing platform. The telescopic rod may be disposed on the water pump shell and the grille net cover adjacent to the filter component. The telescopic rod may be retractable. The filter component may be provided with a connection ring. The connection ring may correspond to a position of the telescopic rod. The telescopic rod may be used to guide a new filter component into the water pump when the filter component is replaced. The magnet may be disposed on the filter component pallet.

In some embodiments, the pressure sensor may communicate with the computing platform according to a preset communication time.

In some embodiments, the computing platform may include a processor. The processor may be used to determine, based on a received pressure sensor reading, a time to replace the filter component. The processor may be further used to re-determine, based on the time to replace the filter component, the preset communication time.

In some embodiments, the processor may be used to determine to replace the filter component in response to a determination that the received pressure sensor reading is greater than or equal to a threshold.

In some embodiments, the processor may be used to predict pressure at a future moment based on a pressure prediction model and determine the time to replace the filter component based on the pressure at the future moment.

In some embodiments, the pressure prediction model may include a pressure feature embedding layer, a water quality feature embedding layer, and a pressure prediction layer. An input of the pressure feature embedding layer may include pressure sensor readings at a plurality of moments in a current or previous preset period of time and an output of the pressure feature embedding layer may include a pressure feature embedding vector. An input of the water quality feature embedding layer may include water quality features at the plurality of moments in the current or previous preset period of time and an output of the water quality feature embedding layer may include a water quality feature embedding vector. An input of the pressure prediction layer may include the pressure feature embedding vector, the water quality feature embedding vector, and a filter medium feature and an output of the pressure prediction layer may include the pressure at the one or more future moments.

In some embodiments, the input of the pressure prediction layer further may include a water exchange rate of the water pump and a correlation between the pressure sensor reading and the water exchange rate of the water pump.

In some embodiments, the re-determining, based on the time to replace the filter component, the preset communication time may include: determining a new preset communication time based on a preset correspondence between the time to replace the filter component and the preset communication time. The time to replace the filter component may be proportional to the preset communication time.

In some embodiments, the processor may be further used to: determine the water exchange rate of the water pump based on the pressure sensor reading. The water exchange rate of the water pump may be adjusted by adjusting a flow control valve.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures throughout the several views of the drawings, wherein.

DETAILED DESCRIPTION

Figure 1:
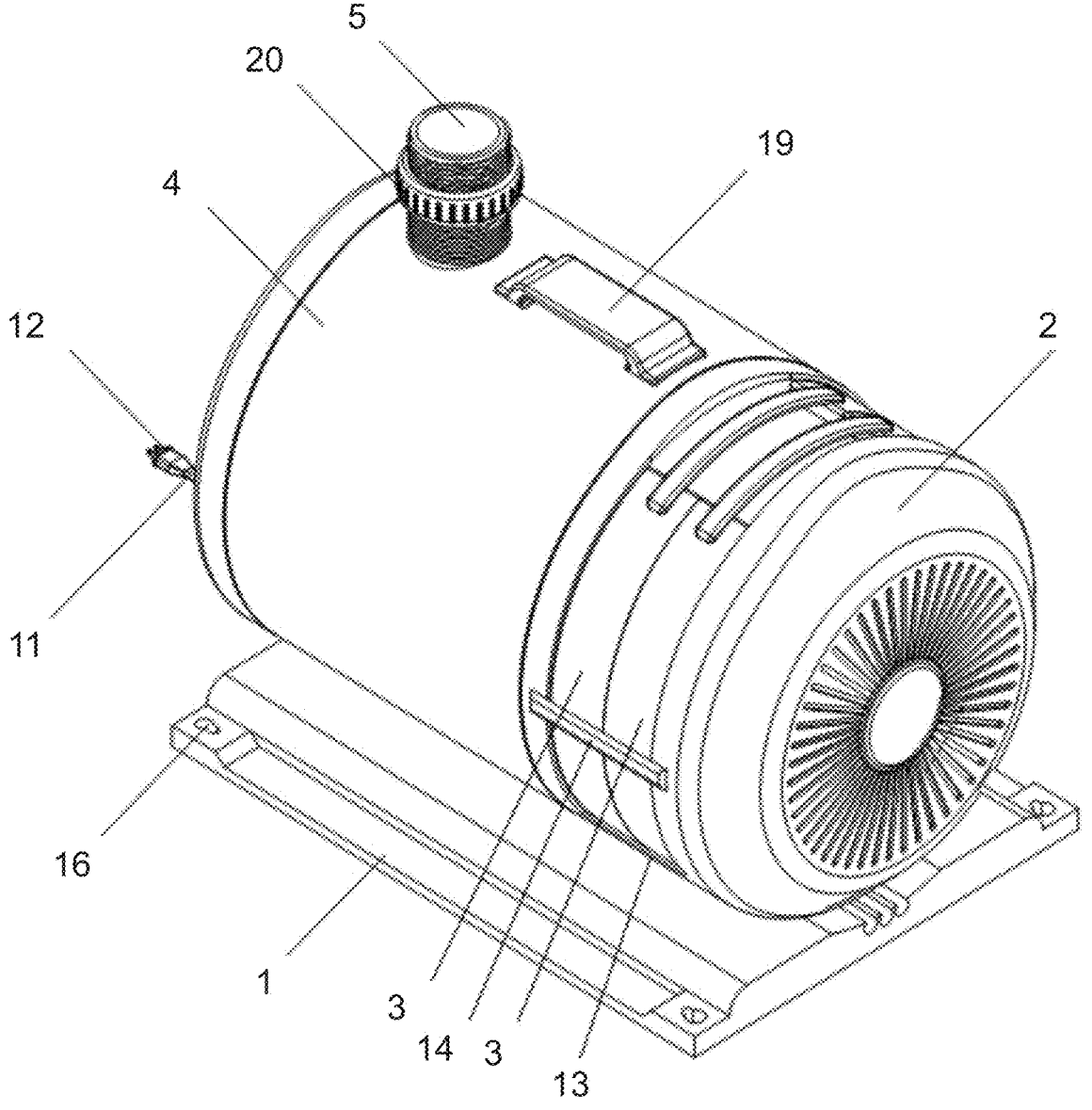
FIG. 1 is an overall structural diagram illustrating a water pump according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

A water pump may be a mechanical device that pressurizes water or other liquids and transports them to a high place. Before the water pump is turned on, the water pump may need to be immersed in water to fill the water pump with liquid. After the water pump is turned on, a motor may drive a water pump impeller to rotate at a high speed and liquid may fly away from the impeller under the action of a centrifugal force. When a liquid pressure gradually increases, the liquid may be discharged from a liquid outlet of the water pump and enter a pipe or above a water surface.

At present, most water pumps for a water landscape may lack an anti-fouling device or only have a simple filter screen. In the water landscape, sticky substances such as fish feces or algae may be very easy to exist on the blades of the water pump, which may affect the working efficiency of the water pump, even cause damage to the water pump, and reduce the service life of the water pump. In addition, as the water pump is usually installed somewhere at the bottom of the water landscape, even if the anti-fouling device or a filtering device is installed, the anti-fouling device or the filtering device may be usually fixedly installed with a water pump main body as an integrated structure, which is difficult to be disassembled. If the anti-fouling device or the filtering device needs to be replaced or cleaned, operations may be cumbersome and time-consuming. If the anti-fouling device or the filtering device is not replaced and cleaned for a long time, the filtration efficiency may be reduced, resulting in poor water quality.

In view of this, some embodiments of the present disclosure provide water pumps for an urban water landscape, which can enable the water pump to have an effective filtering function and facilitate replacement or maintenance of the filtering device.

FIG. 1 is an overall structural diagram illustrating a water pump according to some embodiments of the present disclosure.

In some embodiments, as shown in FIG. 1, the water pump for an urban water landscape may include a water pump main body, a water pump base 1, a grille net cover 2, and a filter component 3. In some embodiments, the water pump main body may include a water pump shell 4. A water outlet interface 5 may be disposed on a top of the water pump shell 4. A water inlet hole 6 may be disposed on a front end face of the water pump shell 4. A water channel 7 with two ends respectively connected to the water inlet hole 6 and the water outlet interface 5 may be disposed inside the water pump shell 4 (see FIG. 3). A motor chamber 8 independent from the water channel 7 may be disposed inside the water pump shell 4 (see FIG. 3). A motor 9 may be disposed in the motor chamber 8 (see FIG. 3). An impeller 10 may be disposed in the water channel 7 (see FIG. 3). An output shaft of the motor 9 may penetrate into the water channel 7 from the motor chamber 8 and may be connected to the impeller 10. A power cord 11 of the motor 9 may be drawn out from a back side of the water pump shell 4 and connected to a power interface 12. The grille net cover 2 may be located on a front side of the water pump shell 4. The grille net cover 2 may be fixedly connected to the water pump shell 4 through a filter component pallet 13 on a bottom of the grille net cover 2 and filter component cross bars 14 on two sides of the grille net cover 2. A space between the grille net cover 2 and the water pump shell 4 may constitute a filter component slot 15 through the filter component pallet 13 and the filter component cross bars 14 (see FIG. 2). Two filter components 3 (i.e., a first component 3 and a second component 3) may be inserted in series in the filter component slot 15. The water pump main body may be detachably disposed on the water pump base 1. Four top corners of the water pump base 1 may be respectively provided with screw holes 16 for being fixedly connected to a bottom of a water landscape pool.

The water pump main body refers to a main part of the water pump, that is, a part that can realize main functions of the water pump. In some embodiments, the water pump main body may include the water pump shell 4.

The water pump shell 4 may be an outer shell of the water pump. In some embodiments, the water pump shell 4 may be used to carry and install a functional component inside the water pump, such as the motor, etc.

In some embodiments, a water inlet hole 6 may be disposed on the front end face of the water pump shell 4 and a water outlet interface 5 may be disposed on the top of the water pump shell 4. In some embodiments, an outer surface of the water outlet interface 5 may be provided with external threads and the water outlet interface 5 may be threadedly connected to a water pipe of the water landscape.

In some embodiments, the water outlet interface 5 may be provided with a flow control valve 20. The adjustable flow control valve 20 may enable the water pump to have a function of adjusting the water flow, which is convenient for a user to adjust the final flow of the water pump. In some embodiments, the outer surface of the flow control valve 20 may be provided with anti-slip bumpy stripes to increase a frictional force, thereby facilitating the user to rotate the flow control valve 20 to avoid slipping.

In some embodiments, a water pump handle 19 may be disposed on the top of the water pump shell 4. For example, the water pump handle 19 may be fixed to the water pump shell 4 by screws, so as to facilitate handling or installation of the water pump.

Figure 2:
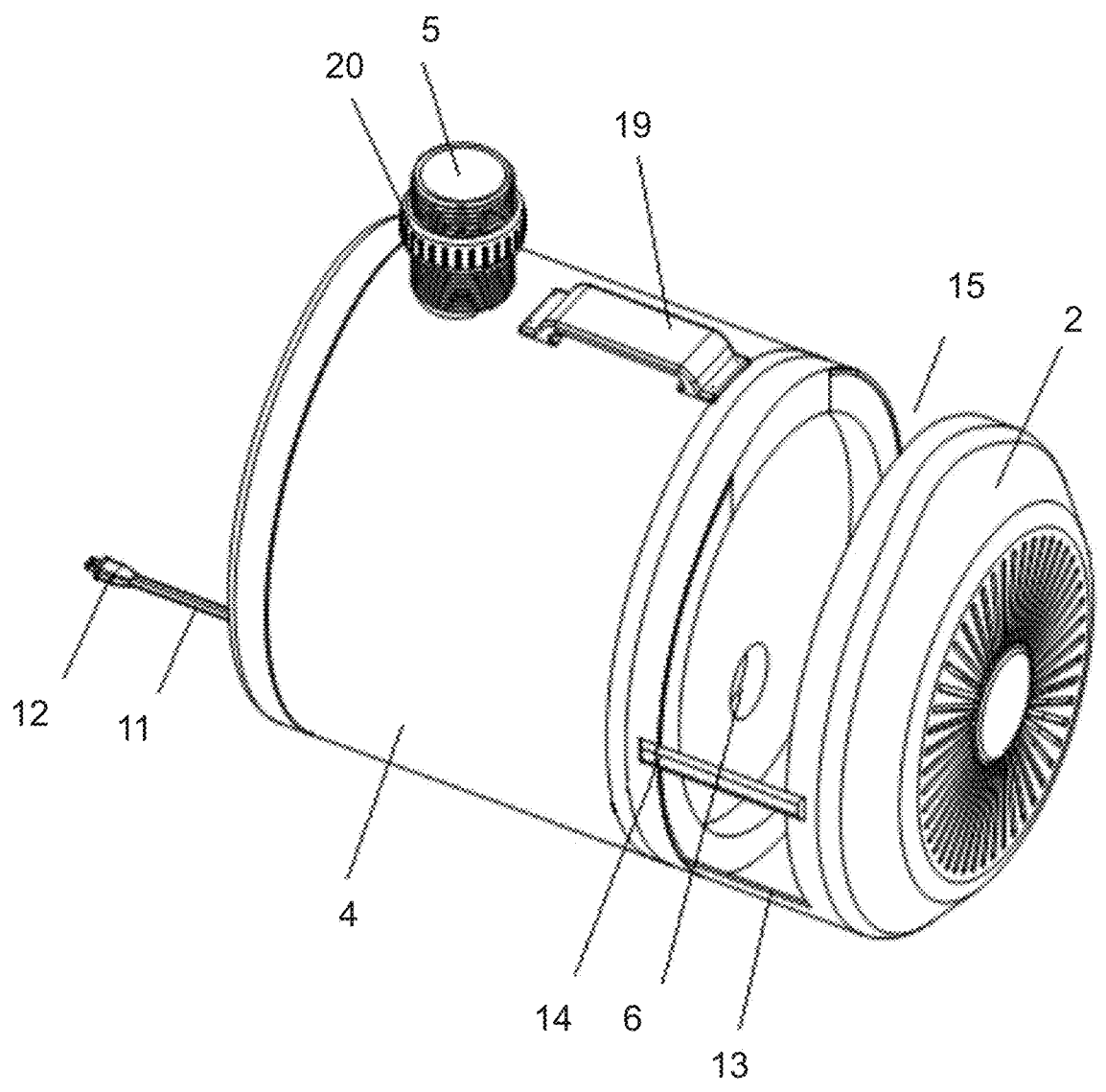
FIG. 2 is a partial structural diagram illustrating a water pump according to some embodiments of the present disclosure.
Figure 3:
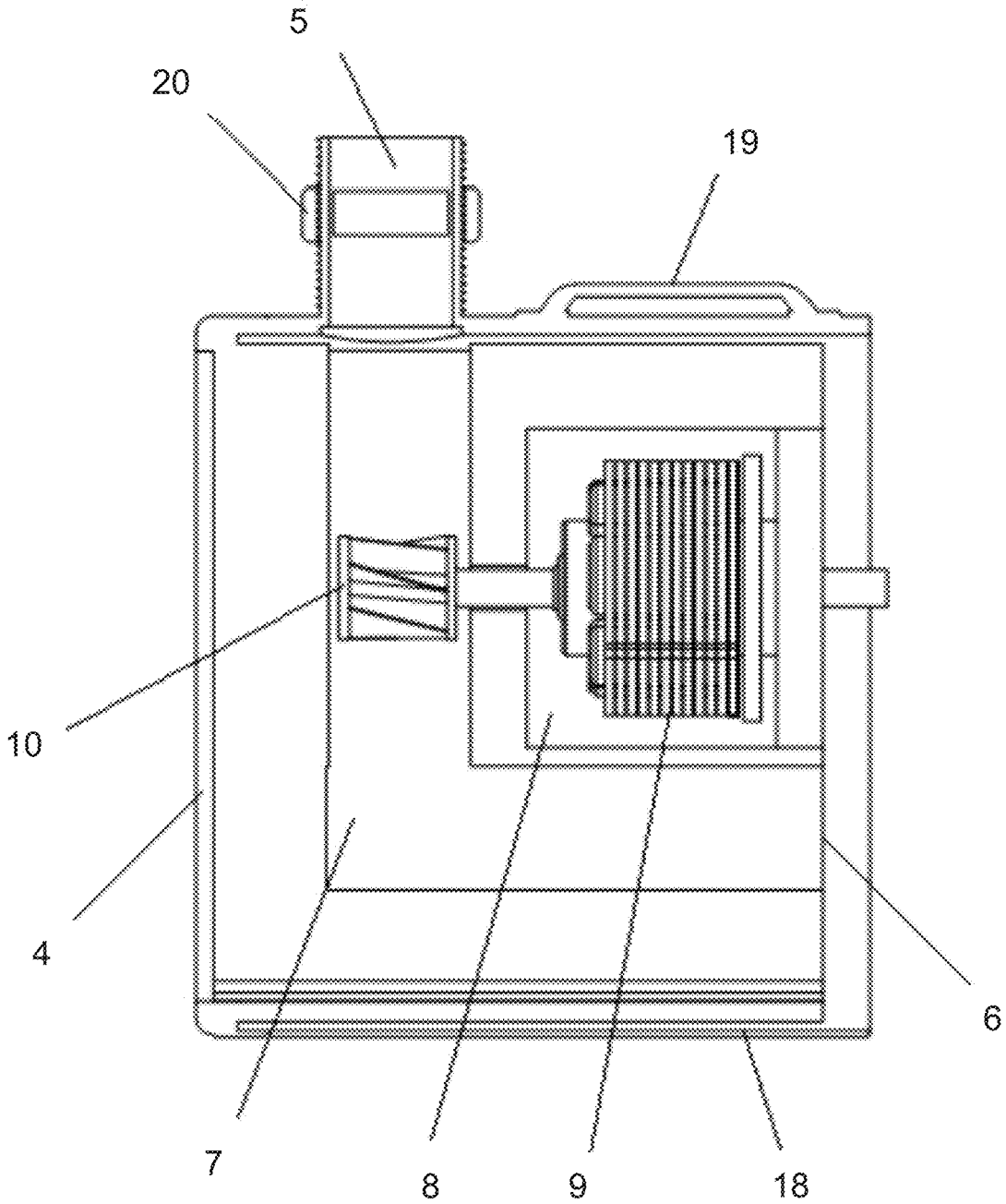
FIG. 3 is a partial structural diagram illustrating a water pump according to some embodiments of the present disclosure.

FIG. 2 is a partial structural diagram illustrating a water pump according to some embodiments of the present disclosure. FIG. 3 is a partial structural diagram illustrating a water pump according to some embodiments of the present disclosure.

In some embodiments, as shown in FIG. 2 and FIG. 3, the water channel 7 with two ends respectively connected to the water inlet hole 6 and the water outlet interface 5 may be disposed inside the water pump shell 4. The water channel 7 may be used for water circulation. The water channel 7 may be set in any feasible shape as long as the water channel 7 can connect the water inlet 6 and the water outlet interface 5 to make the water flow smoothly.

In some embodiments, the impeller 10 may be disposed in the water channel 7. The impeller 10 may rotate to increase power of the water flow and the impeller may be arranged to make the water may flow in a designated direction.

In some embodiments, the motor chamber 8 independent from the water channel 7 may be disposed inside the water pump shell 4 and the motor 9 may be disposed in the motor chamber 8. In some embodiments, an output shaft of the motor 9 may penetrate into the water channel 7 from the motor chamber 8 and may be connected to the impeller 10. In some embodiments, a power cord 11 of the motor 9 may be drawn out from a back side of the water pump shell 4 together with a control line controlling speed regulation of the motor 9 (such as a pulse width modulation (PWM) control line) and connected to the power interface 12.

In some embodiments, the motor 9 may be a direct-current (DC) motor supporting PWM speed regulation, which facilitates programmable flow control of the water pump. In some embodiments, the motor 9 may further be other types of motors capable of achieving a same or similar functional effect.

The grille net cover 2 may be used to block debris that may enter the water inlet 6, for example, debris with a size of more than 0.5 cm such as blades, branches, etc. In some embodiments, the grille net cover 2 may be made of plastic and located on a front side of the water pump shell 4. In some embodiments, the grille net cover 2 may be fixedly connected to the water pump shell 4 through the filter component pallet 13 on a bottom of the grille net cover 2 and filter component cross bars 14 on two sides of the grille net cover 2. Exemplary, as shown in FIG. 2, a lower edge of a back side of the grille net cover 2 may be fixedly connected to a lower edge of a front side of the water pump shell 4 through the filter component pallet 13 and left and right sides of the back side of the grille net cover 2 may be respectively fixedly connected to left and right sides of the front side of the water pump shell 4 through the corresponding filter component cross bars 14. In some embodiments, a space between the grille net cover 2 and the water pump shell 4 may constitute the filter component slot 15 through the filter component pallet 13 and the filter component cross bars 14. Two filter components 13 may be inserted in series in the filter component slot 15.

The filter component 3 may be used to further filter impurities entering the water inlet 6 to avoid blocking. In some embodiments, the filter component 3 may be a filter plate, a filter net, etc. made of one or more filter media.

Figure 4:
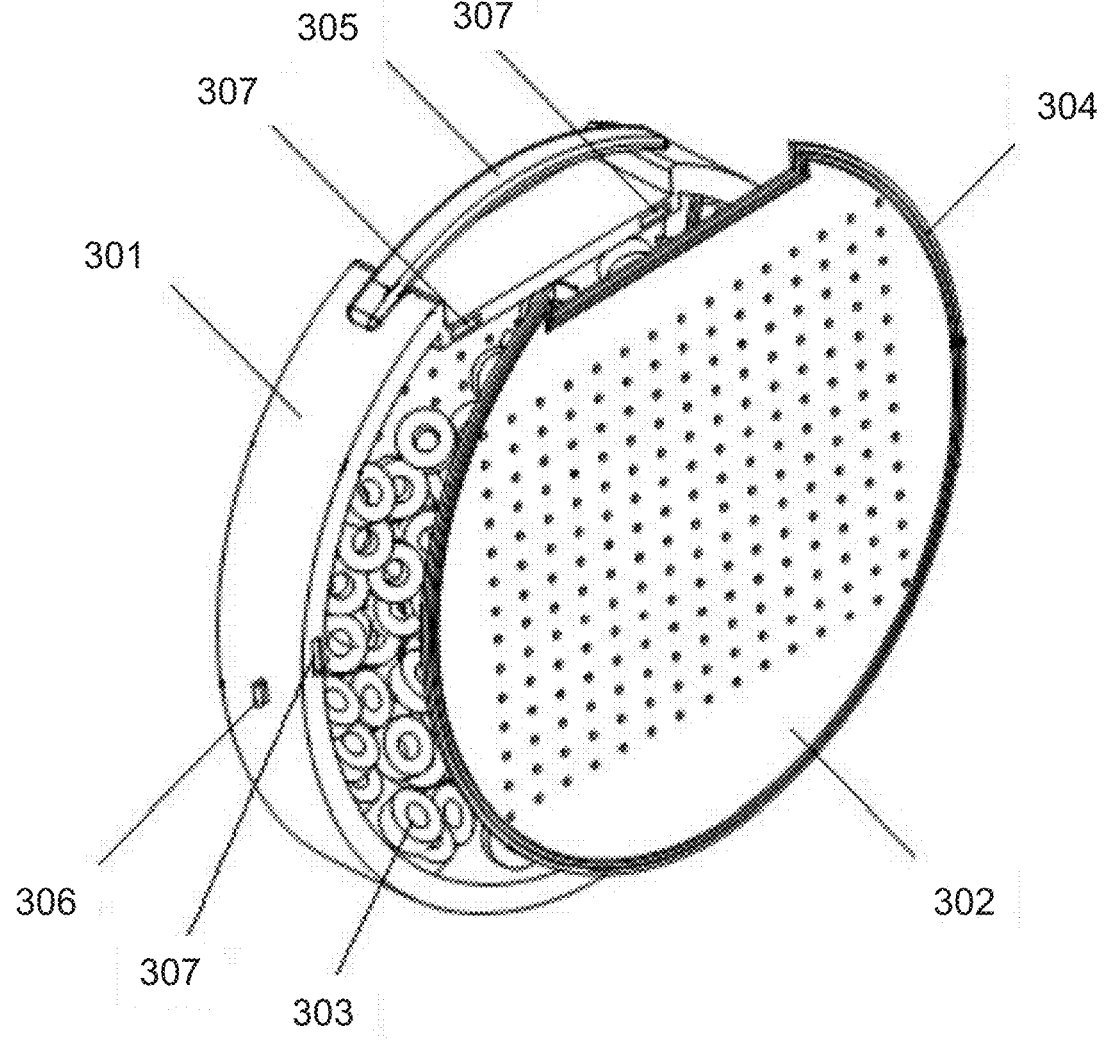
FIG. 4 is a structural diagram illustrating a filter component according to some embodiments of the present disclosure.

FIG. 4 is a structural diagram illustrating a filter component according to some embodiments of the present disclosure. In some embodiments, the filter component 3 may be modularly designed. In some embodiments, the filter component 3 may consist of a filter component annular frame 301, a filter hole plate 302, a filter medium 303, a sealing ring 304, and a filter component handle 305. The filter component annular frame 301 may be used to support and install various components of the filter component 3. The filter hole plate 302 may be used to cooperate with the filter component annular frame 301 to limit a filling position of the filter medium 303. The filter component handle 305 may be used to lift the filter component for easy replacement.

In some embodiments, as shown in FIG. 4, the two filter hole plates 302 may be detachably covered on front and back openings of the filter component annular frame 301, respectively. Outer edges of the two filter hole plates 302 may be provided with the sealing rings 304. The sealing rings 304 may be widened and thickened. The filter hole plates 302 may be sealed with the front and back openings of the filter component annular frame 301 through the corresponding sealing rings 304. In some embodiments, the sealing ring 304 may further serve as a seal between the filter component 3 and the front side of the water pump shell 4, the filter component 3 and the back side of the grille cover 2, or the adjacent filter components 3. In some embodiments, the filter medium 303 may be freely filled in a space formed by the filter component annular frame 301 and the two filter hole plates 302.

In some embodiments, by adopting thickened sealing rubber between the filter component annular frame 301 and the filter hole plate 302, not only a sealing performance between the filter component annular frame 301 and the filter hole plate 302 can be ensured, but also a sealing performance between the plurality of filter components 3, between the filter component 3 and the water pump main body, and between the filter component 3 and the grille net cover 2 can be ensured, thereby guaranteeing a filtering effect in the case of a large flow.

In some embodiments, an inner side edge of the filter hole plate 302 may be provided with a plurality of filter hole plate blocks. Front and back edges of the filter component annular frame 301 may be provided with filter hole plate block slots 307 matching the filter hole plate blocks. The filter hole plate 302 may be fixedly connected to the filter component annular frame 301 through clamping and fitting between the filter hole plate blocks and the filter hole plate block slots 307.

In some embodiments, the filter medium may be a material used for a water treatment and filtration, which may be a filter cotton, a volcanic stone, a medical stone, a breathing ring, etc. The filter component 3 located at a front side (a first component 3) may be generally configured with the filter medium such as a coarse filter cotton, a gauze element, etc. The filter component 3 located at a back side (a second component 3) may be generally configured with the filter medium such as the volcanic stone, the medical stone, the breathing ring, etc.

In some embodiments, the filter component handle 305 may be connected to the filter component annular frame 301 through a corresponding buckle. The filter component handle 305 may be disposed on a top of the filter component annular frame 301.

In some embodiments, two filter component blocks 306 may be respectively disposed on outer walls on the left and right sides of the filter component annular frame 301. Inner walls of the two filter component cross bars 14 on the left and right may be respectively provided with filter component block slots that match the filter component blocks 306. The filter component 3 may be stable and orderly in the filter component slot 15 through clamping and fitting between the left and right filter component blocks and the left and right filter component block slots.

In some embodiments, the modular filter component may be designed and the filter component slot 15 may be designed between the water pump main body and the grille net cover 2, which can enable the water pump to have an effective filtering function, greatly facilitate replacement and maintenance of the filter component 3, and may be adapted to different scenarios, for example, the use of the water body landscape such as a private garden pool fountain, a private rockery, and a commercial water drop, etc. In addition, the filter component 3 may be connected to the filter component slot 15 through the buckle, which can facilitate assembly and disassembly of the filter component 3 on the water pump main body. At the same time, the filter component annular frame 301 may also be connected through the buckle the filter hole plate 302, which can facilitate the replacement of the filter medium inside the filter component to cope with different usage scenarios.

The water pump base 1 may be used to support the water pump main body. In some embodiments, the water pump main body may be firmly placed on the water pump base 1. The water pump base 1 may be made of heavy material to make the water pump stable.

Figure 5:
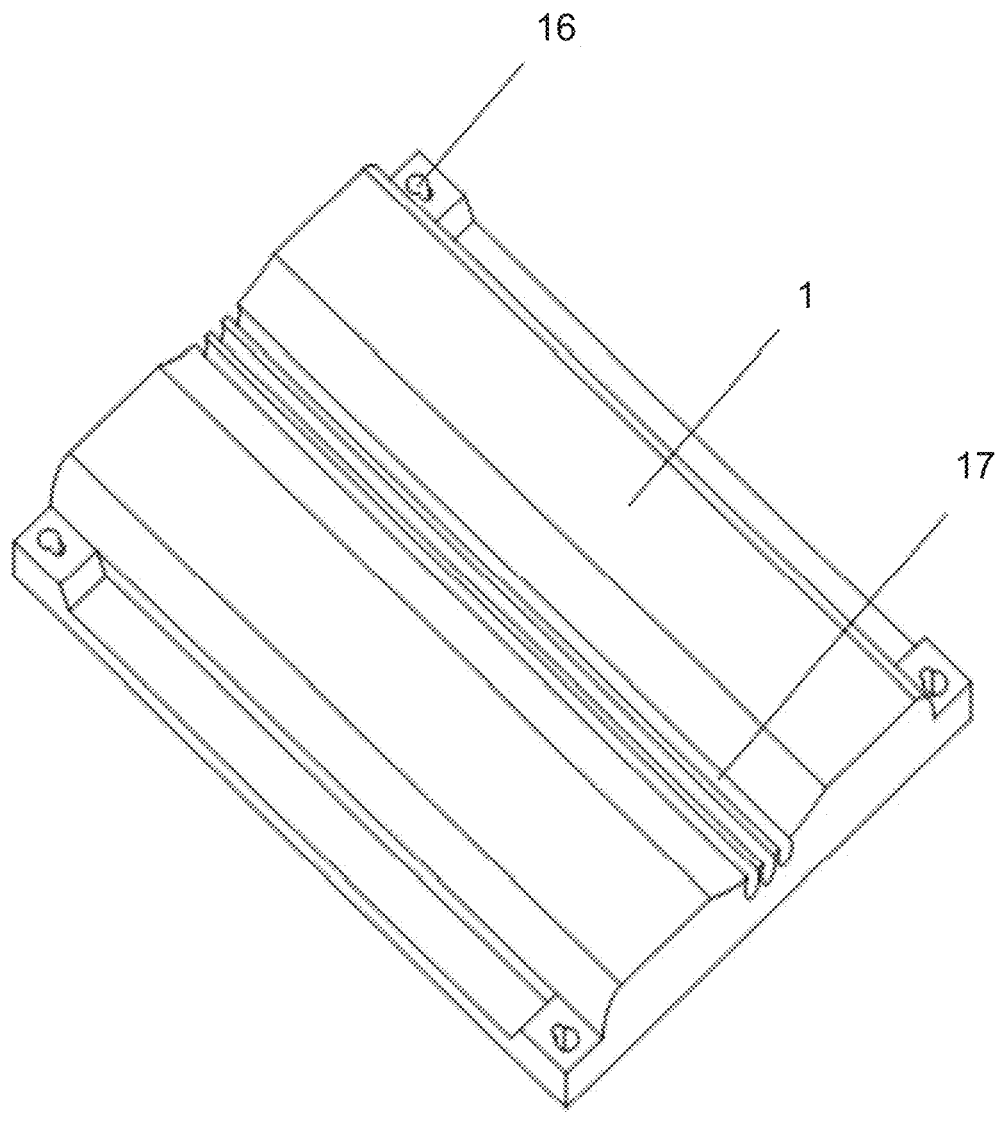
FIG. 5 is a structural diagram illustrating a water pump base according to some embodiments of the present disclosure.
Figure 6:
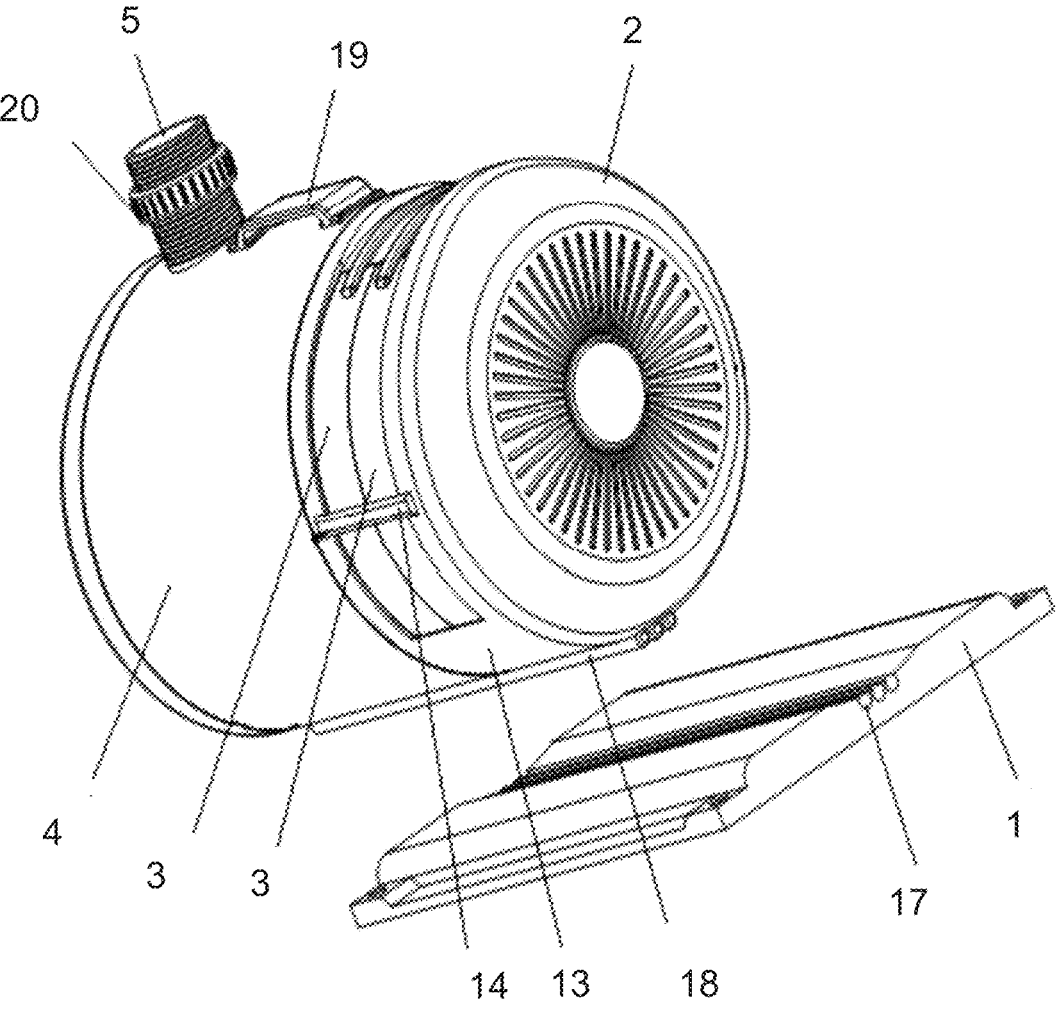
FIG. 6 is a schematic diagram illustrating an installation relationship between a water pump main body and a water pump base according to some embodiments of the present disclosure.

FIG. 5 is a structural diagram illustrating a water pump base according to some embodiments of the present disclosure. FIG. 6 is a schematic diagram illustrating an installation relationship between a water pump main body and a water pump base according to some embodiments of the present disclosure. In some embodiments, as shown in FIG. 5 and FIG. 6, an upper surface of the water pump base 1 may be provided with a plurality of parallel water pump installation chutes 17. A bottom of the water pump shell 4 may be provided with a plurality of water pump installation ridges 18 matching the water pump installation chutes 17. The water pump main body may be detachably installed on the water pump base 1 through plug-in and fitting between the water pump installation ridges 18 and the water pump installation chutes 17.

In some embodiments, four top corners of the water pump base 1 may be respectively provided with the screw holes 16 for being fixedly connected to a bottom of a water landscape pool, which may be fixed with a bottom surface and a wall of a pool using expansion screws.

In some embodiments, when the water pump works, water in the water landscape pool may enter from the grille net cover 2 and debris with a size of more than 0.5 cm may be blocked on the grille net cover 2 first. Other substances with a size of smaller than 0.5 cm may pass through a first filter component 3 configured with a filter medium such as a coarse filter cotton, a gauze element, etc., and impurity particles may be trapped in the first filter component 3. Impurities that have not been adsorbed and filtered by the first filter component 3 may enter a second filter components 3 configured with a filter medium such as a volcanic stone, a breathing ring, etc. and may be absorbed and filtered by the second filter component 3. The pool water passed through the two filter components 3 may enter the water channel 7 inside the water pump main body from the water inlet hole 6 of the water pump main body and drive the impeller 10 to rotate with the motor 9. The filtered pool water may be pumped out from the water outlet interface 5 on the top of the water pump body through the water channel 7. The water outlet flow of the water pump main body may be controlled by adjusting the flow control valve 20 on the water outlet interface 5. When the filtered impurities in the filter component 3 accumulate to a certain extent, the old filter component 3 may be pulled out from the filter component slot 15 and may be replaced with a new filter component 3 or the filter medium in the filter component 3 may be replaced and the initial filtration efficiency of the filter component 3 may be achieved without taking out the water pump main body from the pool. The buckles may be adopted between the filter component 3 and the filter component slot 15 and between the filter component annular frame 301 and the filter hole plate 302, which can facilitate the replacement of the filter component 3 on the filter component slot 15 and the replacement of the filter medium 303 inside the filter component 3.

Figure 7:
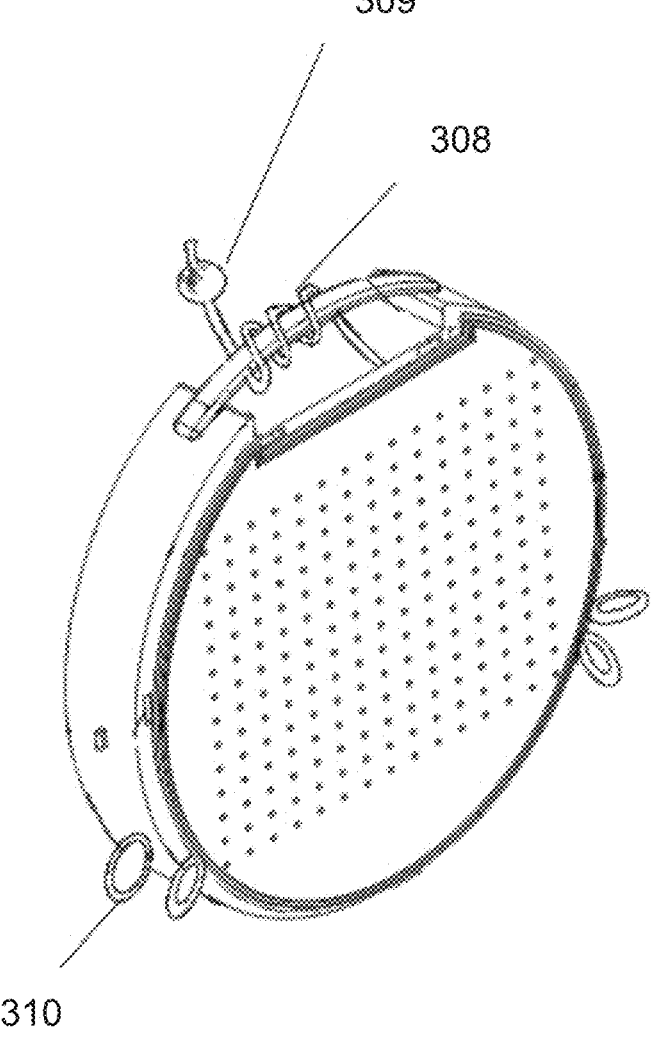
FIG. 7 is a structural diagram illustrating a filter component according to some embodiments of the present disclosure.
Figure 8:
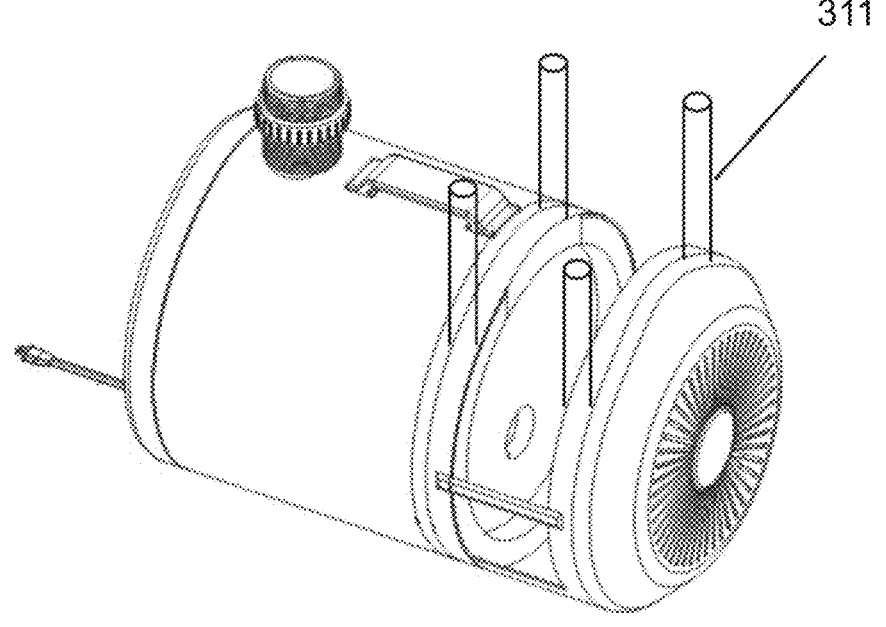
FIG. 8 is a structural diagram illustrating a telescopic rod according to some embodiments of the present disclosure.

FIG. 7 is a structural diagram illustrating a filter component according to some embodiments of the present disclosure. FIG. 8 is a structural diagram illustrating a telescopic rod according to some embodiments of the present disclosure.

In some embodiments, as shown in FIG. 7 and FIG. 8, a water pump may further include a pressure sensor (not shown in the figure), a cable 308, a telescopic rod 311, a magnet (not shown in the figure), and a water quality detection sensor (not shown in the figure). The pressure sensor may be disposed on the filter component 3. the cable 308 may be wound around the filter component handle 305. A color-labeled suspension ball 309 may be provided at an outlet of the cable 308. The suspension ball 309 may be used for periodical release and retraction. The cable 309 may be used f for communication between the pressure sensor and a computing platform. A reel of the cable 308 may be disconnectably connected to the motor 9 through a transmission mechanism. A controller may control disconnection and connection between the reel of the cable 308 and the motor 9 to realize the periodical release and retraction of the suspension ball 309 and the suspension ball 309 may surface after release and communicate with the computing platform. The telescopic rod 311 may be disposed on the water pump shell 4 and the grille net cover 2 adjacent to the filter component 3. The telescopic rod 311 may be retractable. The filter component 3 may be disposed with a connection ring 310. The connection ring 310 may correspond to a position of the telescopic rod 311. The telescopic rod 311 may be used to guide a new filter component 3 into the water pump when the filter component is replaced. The magnet may be disposed on the filter component pallet 13.

The cable 308 may be used to extract the filter component 3 from the water and for communication. The cable 308 may include a wire core, an insulating layer, a shielding layer, a protective layer, etc. For example, the cable may be an insulated polyvinyl chloride cable, a tinned or silver-plated cable, a water-cooled cable, etc.

The suspension ball 309 may be a device capable of emerging from the water. In some embodiments, the suspension ball 309 may be a hollow sphere. For example, the suspension ball 309 may be a hollow sphere made of polyurethane-polyethylene compound, polystyrene-wrapped cloth, or crusted polyethylene. In some embodiments, the suspension ball 309 may have an eye-catching color, such as a paint with a bright color, a fluorescent paint, etc. When the filter component 3 needs to be replaced, the cable 308 may be easily found through the suspension ball 309, so that the filter component 3 may be drawn out by pulling the cable. The suspension ball 309 may be released and retracted periodically and the power for the retraction may be provided by the water pump. For example, the reel of the cable 308 may be disconnectably connected to the motor 9 through the transmission mechanism (e.g., the transmission mechanism may be a device for power transmission including a mechanism such as a gear, etc. and control whether to disconnect by controlling engage and disengage of the gears in the transmission mechanism) and a controller may control the connection and disconnection between the reel of the cabal 308 and the motor 9 to realize the periodical release and retraction of the suspension ball 309. In some embodiments, the suspension ball 309 may communicate with the computing platform only when the suspension ball 309 surfaces when released. The computing platform may be used to receive and process data and send an instruction, etc. In some embodiments, the computing platform may be disposed in a control room on shore.

The telescopic rod 311 refers to a device for guiding the filter component 3 into the water pump. In some embodiments, the telescopic rod 311 may be retractable. The filter component 3 may be provided with the connection ring 310. The connection ring 310 may correspond to the position of the telescopic rod 311. In some embodiments, the telescopic rod 311 may include a rod body and a connection buckle. The connection buckle may be disposed on an upper part of the rod body for fastening with the connection ring 310 on the filter component 3. The rod body may be freely retracted to guide the filter component 3 into the water pump. For example, a material of the telescopic rod 311 may be iron, copper, aluminum, etc.

In some embodiments, the telescopic rod 311 may be disposed on the water pump shell 4 and the grille net cover 2 adjacent to the filter component 3. The upper parts of the water pump shell 4 and the grille net cover 2 may be respectively provided with a plurality of telescopic rods 311, as shown in FIG. 8.

In some embodiments, the magnet may be disposed on the filter component support pallet 13. The filter component 3 and the water pump may be further installed in place through an action of a magnetic force. In some embodiments, the water pump may include an inductive alarm device, such as an infrared alarm device. The closer the new filter component 3 is detected to the water pump, the louder the prompt sound may be, thereby assisting in determining whether the filter component 3 is installed in place. In some embodiments, the computing platform may control the extension of the telescopic rod 311 until the telescopic rod 311 extends out of the water based on a warning sent by the inductive alarm device that senses the new filter component 3. The connection ring 310 of the new filter component 3 may be placed on the telescopic rod 311. Under the action of a gravity and a magnet attraction, the new filter component 3 may enter the corresponding position of the water pump and then the telescopic rod 311 may be retracted.

A water quality detection sensor refers to a sensor used to detect a water quality condition. For example, the water quality detection sensor may be a residual chlorine sensor, a conductivity sensor, a Pondus Hydrogenii (pH) sensor, an oxidation-reduction potential (ORP) sensor, a turbidity sensor, etc.

The pressure sensor may be used to detect a pressure of the water filtered by the filter component. For example, the pressure sensor may be a resistance strain gauge pressure sensor, a semiconductor strain gauge pressure sensor, a piezoresistive pressure sensor, etc. In some embodiments, the pressure sensor may be disposed on the second filter component 3.

In some embodiments, the pressure sensor may communicate with the computing platform according to a preset communication time.

The pressure sensor may be configured to communicate periodically with the computing platform. The preset communication time refers to a time when the pressure sensor communicates with the computing platform periodically. For example, the preset communication time may be 12 hours, that is, the pressure sensor may communicate with the computing platform once every 12 hours, the suspension ball 309 may be released during the communication, and the suspension ball 309 may be retracted when the communication ends.

In some embodiments, the computing platform may include a processor. The processor may be used to determine, based on a received pressure sensor reading, a time to replace the filter component 3. The processor may be further used to re-determine, based on the time to replace the filter component 3, the preset communication time.

In some embodiments, the processor may be used to determine to replace the filter component 3 in response to a determination that the received pressure sensor reading is greater than or equal to a threshold.

In some embodiments, the threshold refers to a pressure threshold preset manually based on experience or by the processor based on historical data. When the pressure of the water filtered by the filter component 3 is greater than or equal to the pressure threshold, it may mean that a filtration performance of the filter component 3 cannot meet the requirement and the filter component 3 needs to be replaced. In some embodiments, the threshold may be adjusted based on a detected amount of impurities through performing an impurity detection on the replaced filter component 3. In some embodiments, the threshold may be adjusted according to a preset corresponding relationship and the preset corresponding relationship may be obtained manually based on the experience or experiments, for example, the relationship between the amount of impurities and the pressure may be obtained through the experiments.

In some embodiments, the processor may predetermine the time to replace the filter component 3 by predicting pressure at a future moment, so as to prepare for the replacement in advance and improve the working efficiency of the water pump. In some embodiments, the processor may predict the pressure at the future moment based on a pressure prediction model and determine the time to replace the filter component based on the pressure at the future moment.

Figure 9:
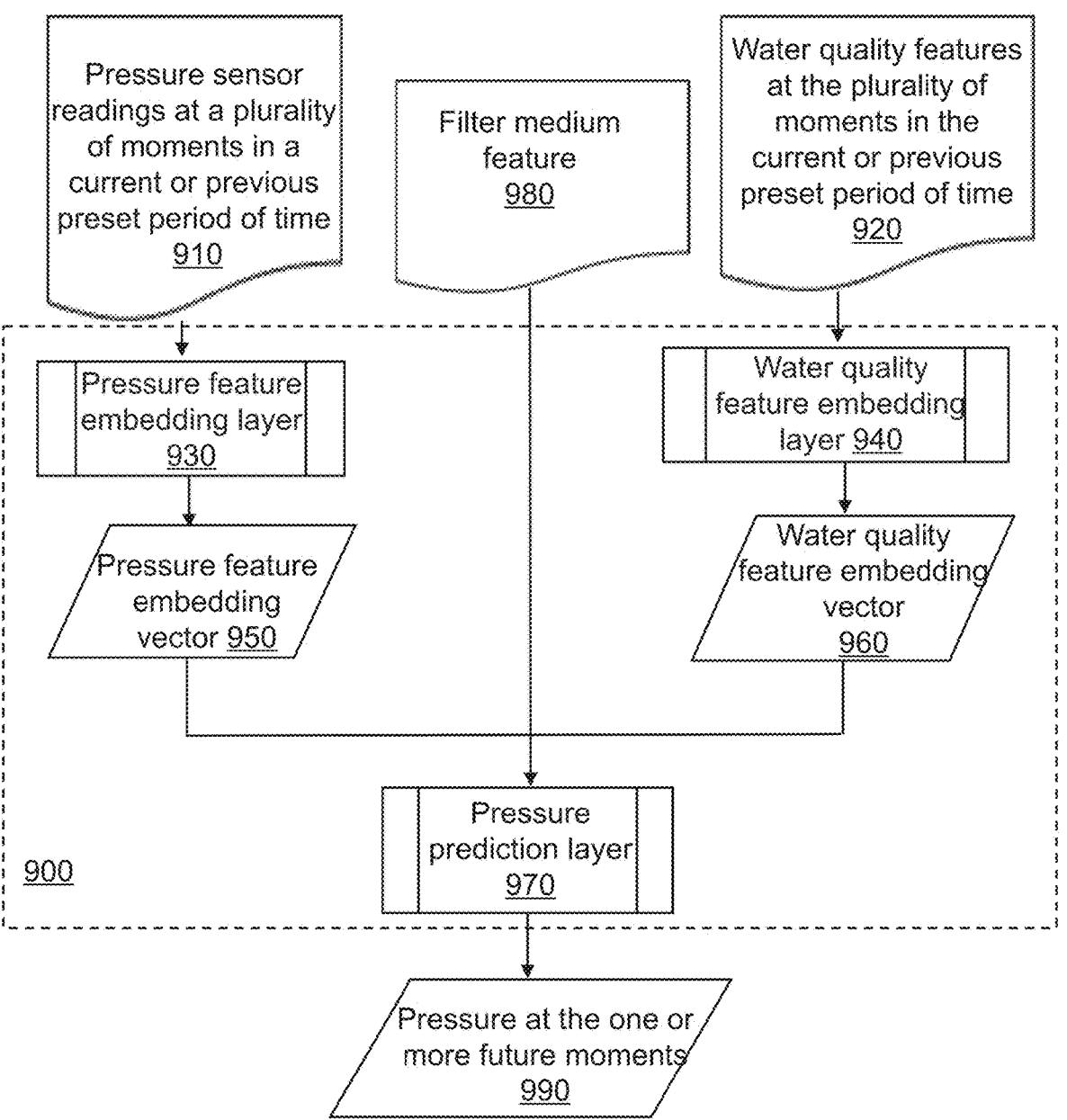
FIG. 9 is a model diagram illustrating a pressure prediction model according to some embodiments of the present disclosure.

FIG. 9 is a model diagram illustrating a pressure prediction model according to some embodiments of the present disclosure.

As shown in FIG. 9, in some embodiments, the pressure prediction model 900 may include a pressure feature embedding layer 930, a water quality feature embedding layer 940, and a pressure prediction layer 970. An input of the pressure feature embedding layer 930 may include pressure sensor readings 910 at a plurality of moments in a current or previous preset period of time and an output of the pressure feature embedding layer 930 may include a pressure feature embedding vector 950. An input of the water quality feature embedding layer 940 may include water quality features 920 at the plurality of moments in the current or previous preset period of time and an output of the water quality feature embedding layer 940 may include a water quality feature embedding vector 960. An input of the pressure prediction layer 970 may include the pressure feature embedding vector 950, the water quality feature embedding vector 960, and a filter medium feature 980 and an output of the pressure prediction layer 970 may include pressure 990 at the one or more future moments. The pressure sensor readings 910 at the plurality of moments in the current or previous preset period of time may be obtained by the pressure sensor. The water quality features 920 at the plurality of moments in the current or previous preset period of time may be obtained by a water quality detection sensor. The filter medium feature 980 may include a feature of the filter medium 303, such as a type, a mass, a density, etc. of the material.

In some embodiments, when the pressure at the one or more future moments output by the pressure prediction model 900 is greater than or equal to a threshold, the one or more future moments may be taken as the times to replace the filter component.

In some embodiments, the output of the pressure feature embedding layer 930 and the output of the water quality feature embedding layer 940 may be the input of the pressure prediction layer 970. The pressure feature embedding layer 930, the water quality feature embedding layer 940 and the pressure prediction layer 970 may be obtained through joint training. In some embodiments, sample data of the joint training may include pressure sensor readings at a plurality of moments in a sample preset period of time, water quality features at the plurality of moments in the sample preset period of time, and a sample filter medium feature in historical detection data. A label may be sample pressure at the one or more future moments determined manually based on actual detection data. The pressure sensor readings at the plurality of moments in the sample preset period of time and the water quality features at the plurality of moments in the sample preset period of time may be respectively input to the pressure feature embedding layer and the water quality feature embedding layer to obtain the pressure feature embedding vector and the water quality feature embedding vector respectively output by the pressure feature embedding layer and the water quality feature embedding layer. The pressure feature embedding vector and the water quality feature embedding vector output respectively by the pressure feature embedding layer and the water quality feature embedding layer may be used as sample training data. The sample training data and the sample filter medium feature may be input into the pressure prediction layer to obtain the pressure at the one or more future moments output by the pressure prediction layer. A loss function may be constructed based on the sample pressure at the one or more future moments determined manually according to the actual detection data and the pressure at the one or more future moments output by the pressure prediction layer. Parameters of the pressure feature embedding layer, the water quality feature embedding layer, and the pressure prediction layer may be updated synchronously until a preset condition is satisfied and the training may be completed. The preset condition may be the loss function being smaller than a threshold, converging, or the training period reaching a threshold, or the like, or any combination thereof.

In some embodiments, the input of the pressure prediction layer may further include a water exchange rate of the water pump and a correlation between the pressure sensor reading and the water exchange rate of the water pump.

The water exchange rate of the water pump refers to a rate at which the water pump filters the water. For example, the water exchange rate of the water pump may be 10 m/s.

In some embodiments, the pressure sensor reading may have a negative correlation with the water exchange rate of the water pump, that is, the greater the pressure sensor reading is, the smaller the water exchange rate of the water pump may be. The reason may be that the greater the pressure sensor reading is, the more impurities the current filter component 3 adsorbs and the lower the adsorption capacity is. The water exchange rate of the water pump may need to be reduced, so that the time for water to pass through the filter component may increase to avoid the reduction of the filtering effect.

In some embodiments, the re-determining, based on the time to replace the filter component 3, the preset communication time may include: determining a new preset communication time based on a preset correspondence between the time to replace the filter component 3 and the preset communication time. The time to replace the filter component 3 may be proportional to the preset communication time to the preset communication time.

For example, if the time to replace the filter component 3 is relatively long, the preset communication time may be increased accordingly. Exemplarily, the original preset communication time may be 12 hours. In actual use, it may be found that the filter component 3 is replaced every 5 days, so there is no need to communicate frequently. The preset communication time may be re-determined as 48 hours or more than 48 hours.

In some embodiments, the processor may be further used to determine the water exchange rate of the water pump based on the pressure sensor reading. In some embodiments, the water exchange rate of the water pump may be adjusted by adjusting the flow control valve 20. In some embodiments, the greater the pressure sensor reading is, the more impurities the current filter component 3 adsorbs, and the lower the adsorption capacity is, the smaller the water exchange rate of the water pump may be required to achieve the filtering effect. In some embodiments, the water exchange rate of the water pump may be reduced by reducing the water flow through the flow control valve 20.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A water pump for landscape water, comprising a water pump main body, a water pump base, a grille net cover, and two filter components, wherein the water pump main body includes a water pump shell, a water outlet interface is disposed on a top of the water pump shell, a water inlet hole is disposed on a front end face of the water pump shell, a water channel with two ends respectively connected to the water inlet hole and the water outlet interface is disposed inside the water pump shell, a motor chamber independent from the water channel is disposed inside the water pump shell, a motor is disposed in the motor chamber, and the grille net cover is located on a front side of the water pump shell, the grille net cover is fixedly connected to the water pump shell through a filter component pallet on a bottom of the grille net cover and two filter component cross bars on two sides of the grille net cover, the filter component pallet and the two filter component cross bars along with the grille net cover and the water pump shell define a filter component slot with an opening on top for receiving the two filter components, the two filter components are inserted in series in the filter component slot, and the water pump main body is detachably disposed on the water pump base;

an upper surface of the water pump base is provided with a plurality of parallel water pump installation chutes, a bottom of the water pump shell is provided with a plurality of water pump installation ridges matching the water pump installation chutes in shape, and the water pump main body is detachably installed on the water pump base through plug-in and fitting between the water pump installation ridges and the water pump installation chutes; and each of the two filter components consists of a filter component annular frame having a front opening and a back opening, two filter hole plates, a filter medium, and a filter component handle, the two filter hole plates detachably cover on the front opening and the back opening of the filter component annular frame, respectively, an outer edge of each of the two filter hole plates is provided with a sealing ring, the two filter hole plates are sealed with the front opening and the back opening of the filter component annular frame through the corresponding sealing rings, the filter medium is freely filled in a space formed by the filter component annular frame and the two filter hole plates, and the filter component handle is detachably disposed on a top of the filter component annular frame; wherein an inner side edge of each of the two filter hole plates is provided with a plurality of filter hole plate blocks, and the filter component annular frame is provided with filter hole plate block slots matching the filter hole plate blocks.

2. The water pump for landscape water of claim 1, wherein the filter medium is a filter cotton, a volcanic stone, a medical stone, or a breathing ring.

3. The water pump for landscape water of claim 1, wherein two filter component blocks are respectively disposed on an outer wall of each of the filter component annular frames, and each of the two filter component cross bars has an inner surface provided with a filter component block slot matching with corresponding filter component blocks.

4. The water pump for landscape water of claim 1, wherein a water pump handle is disposed on a top of the water pump shell.

5. The water pump for landscape water of claim 1, wherein a flow control valve is disposed on the water outlet interface.

6. The water pump for landscape water of claim 1, wherein the motor is a direct-current (DC) motor supporting pulse width modulation (PWM) speed regulation.

7. The water pump for landscape water of claim 1, wherein an impeller is disposed in the water channel, and an output shaft of the motor penetrates into the water channel from the motor chamber and is connected to the impeller.

* * * * *